Dec. 19, 1939.                C. W. CHERRY                2,183,543
                RIVET AND METHOD OF APPLYING THE SAME
                        Filed June 21, 1937

INVENTOR.
CARL W. CHERRY
BY George B. White
ATTORNEY.

Patented Dec. 19, 1939

2,183,543

UNITED STATES PATENT OFFICE 2,183,543

RIVET AND METHOD OF APPLYING THE SAME

Carl W. Cherry, Carmel, Calif.

Application June 21, 1937, Serial No. 149,331

5 Claims. (Cl. 218—29)

This invention relates to rivets and method of riveting.

An object of the invention is to provide a method whereby rivets, bolts, stays, or the like, can be readily fastened in place in objects without hammering, or without any necessity for backing.

Another object of the invention is to provide a method for riveting whereby hollow or tubular rivets, bolts, stays or the like can be fastened in place by easy manipulation from one side of the objects fastened together.

A further object of the invention is to provide a rivet or the like which may be fastened in place by an apparatus applied at one end of the rivet or from one side of plates to be riveted and whereby hammering and backing is entirely obviated.

A further object of the invention is to provide a method whereby a hollow rivet can be fastened in place by forces exerted and transmitted from one side of the rivet through the passage in the rivet to simultaneously press on both ends of the rivet.

Another object of this invention is to provide a method for riveting which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawing.

With the foregoing and other objects in view, which will be made manifest in the following detailed description and specifically pointed out in the appended claims, reference is had to the accompanying drawing for the illustrative embodiment of the invention, wherein:

Figure 1:
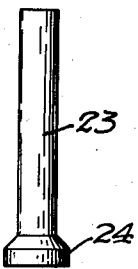
Figure 1 is a detail side view of the former shank of my rivet.
Figure 2:
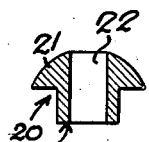
Figure 2 is a sectional detail view of a hollow rivet.
Figure 3:
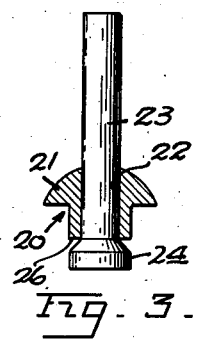
Figure 3 is an assembled view of the rivet and shank, partly in section.
Figure 4:
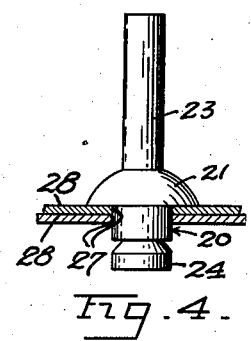
Figure 4 is an assembled view of the rivet and shank in plates to be joined.
Figure 5:
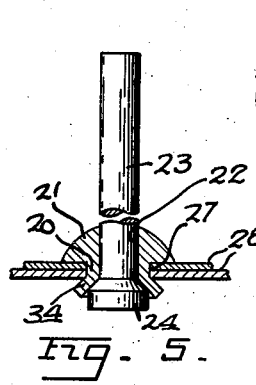
Figure 5 is a partly sectional view of the rivet in place as the rivet tail is formed.
Figure 6:
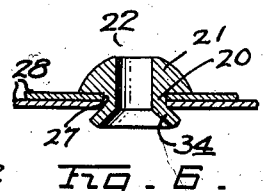
Figure 6 is a sectional view of the completed rivet joint.
Figure 7:
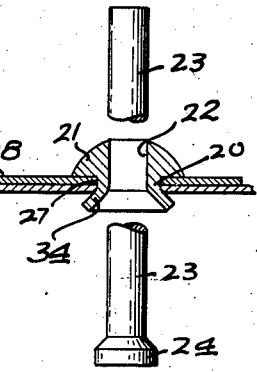
Figure 7 is a partly sectional view of the riveted joint, showing the shank broken.

In my method of applying rivets the first step is the placing of a hollow rivet into the holes of the objects to be fastened together. The second step is the simultaneous application of pressure to both ends of the rivet to a degree to press the opposed ends of the rivets against the opposite sides of said objects so as to hold the same fast together. The force for said opposed pressure at both ends of the rivet is preferably applied from one end only of the rivet but is transmitted through the passage in the rivet to the other end. The force is transmitted to the farther end of the rivet by an element adapted to automatically limit pressure to a predetermined degree. For instance this last step may be accomplished by the use of a tension member the elastic limit of which is such that said member breaks when a given pressure is reached between the opposed ends of the rivet.

I use in connection with my methods in the herein illustration a tubular rivet 20 with a rivet head 21 preformed at one end thereof. Through the passage 22 of the rivet is extended the shank 23 of a former 24, so that the former 24 is opposite the tail point 26 of the rivet 20. When the rivet is thus assembled it is placed in the aligned holes 27 of the objects to be fastened together, such as for instance of plates 28. It is to be noted that the former 24 is mitered at its inner edge toward and into the end of the rivet passage 22 and is of the same or smaller outer diameter than that of the rivet 20. This bevel or miter on the former 24 determines the angle and shape to which the tail point 26 is spread. Therefore formers of various shapes and designs may be employed according to the type of rivet tail desired.

Figure 8:
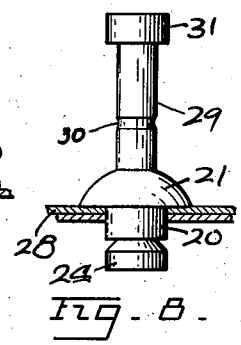
Figure 8 is an assembled view of a rivet with another form of former shank.
Figure 9:
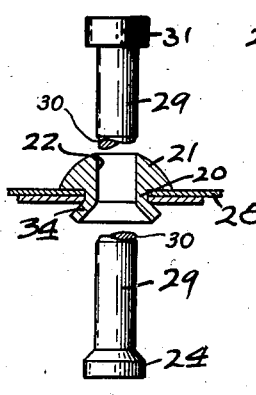
Figure 9 is a sectional view of the riveted joint showing the former shank broken.
Figure 10:
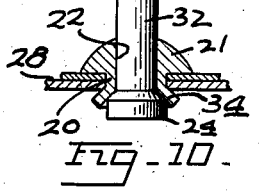
Figure 10 is a partly sectional view of an assembled rivet, and another modified former shank.

The form of shank 23 shown in Figures 1 to 5 may be gripped by any suitable chuck or the like gripping jaws. The shank 29 shown in Figures 8 and 9 is provided with a grip head 31 to facilitate the gripping of the shank 29. The shank 32 shown in Figure 10 has a flattened enlarged pulling end 33 formed after the shank 32 is assembled through the rivet 20 for engagement by a suitable gripper. In all forms of shanks a line of constriction may be provided in the form of an indent or groove 30, as shown in Figures 8 and 9 to determine the location of the breaking point of the shank.

In operation the shank 23, 29, or 32, is gripped at its free end and a pull is exerted thereon so as to force the former 24 against and inside the tail point 26 so as to spread the tail point 26 and form a suitably shaped rivet tail 34 pressed against the adjacent plate 28. It is preferable that pressure be exerted on the rivet head 21 simultaneously with the pulling force on the former shank. In other words the leverage for the pulling force on the former die is fulcrumed or borne by pressure on the rivet head 21.

Figure 11:
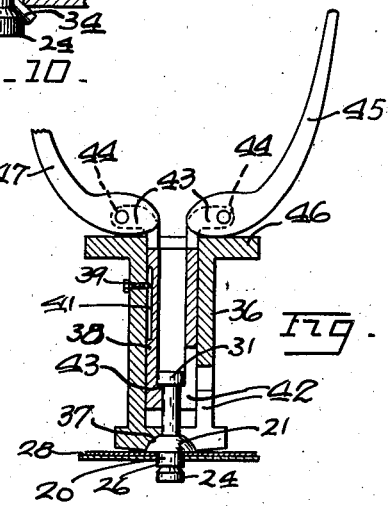
Figure 11 is a fragmental, somewhat diagrammatic sectional view of a riveting apparatus for my rivet.

A riveting apparatus to accomplish the aforesaid steps of riveting is illustrated in Figure 11. In this apparatus an outer cylinder or casing 36 has a seat or dolly 37 that fits over the exterior of the rivet head 21. A shank holder 38 is slidable within the casing 36 and is prevented from turning by a set screw 39 which is extended from the casing 36 into a longitudinal key slot 41 on the holder 38. Both the outer casing 36 and the inner holder 38 are cut away at one side near the dolly 37 so as to form an inlet 42 for the introduction of the rivets and shanks into the apparatus. The holder 38 is provided at its inner end for a suitable engagement element with the former shanks. The holder 38 in the embodiment shown in Figure 11, has a shouldered end 43 fitting under the shank head 31.

In operation the casing 36 is pressed against the rivet head 21 and simultaneously the shank holder 38 is pulled outwardly of the casing 36 and away from the rivet head 21 so as to pull the former 24 against and into the point 26 of the rivet until said point is spread into a rivet tail. The extent of tension may be regulated by the stroke of the holder 38. If it is desired the former shank may be left within the fastened rivet to fill the rivet passage 22. However, by having former shanks of equal strength the same may be designed for a suitable uniform, ultimate stress so as to break when the rivet is fast, and the broken pieces then readily fall out of the rivet passage 22. In this latter event, if necessary, the rivet passages 22 may be filled with metal cement, or the aforesaid tapered metal pin, or the like after the riveting is completed.

The apparatus may be operated manually, or hydraulically, or electrically. For the purpose of illustration in the embodiment in Figure 11 a pair of cams 43 are fulcrumed each to an opposed lug 44 on the open end of the shank holder 38 so that the cams 43 bear against an end flange 46 of the casing 36. An arm or handle 45 extends from each cam 43. As the handles 45 are pressed toward each other the cams 43 bear against the casing flange 46 and exert an outward pull on the fulcrum on the lugs 44. Thus the casing 36 is pressed against the rivet head 21 and the shank holder 38 pulls the former 24 against the rivet point 26 until the rivet is fastened.

The extent of pressure exerted in forming the tail of a rivet is determined by the breaking of the shanks, which are preferably made of uniform elastic limit so as to break at the same ultimate stress. But the same may be also determined by the length of the stroke to which the former shank is pulled. This can be also accomplished by releasing the grip on the shank of the former after a predetermined stroke.

Having thus described my invention what I now claim and desire to secure by Letters Patent is:

1. As an article of manufacture, a rivet assembly comprising, a hollow rivet, a preformed head at one end of the hollow rivet, a tension member slidable in the passage of the hollow rivet, a former on the tension member adjacent the tail of the rivet and extending into said tail for spreading the tail outwardly into fastening position when pulled by said tension member, and an enlarged head formed integrally on the portion of the tension member outside said head whereby an axial pulling force can be applied to said tension member, said tension member having an area of predetermined reduced tensile strength where the tension member yields and breaks after the forming of the rivet tail to a predetermined flare.

2. As an article of manufacture, a rivet assembly comprising, a hollow rivet, a preformed head at one end of the hollow rivet, a tension member in the passage of the hollow rivet, a former on the tension member adjacent the tail of the rivet, for spreading the tail into fastening position when pulled by said tension member, and an enlarged head formed integrally on the portion of the tension member outside said head whereby an axial pulling force can be applied to said tension member, said tension member being adapted to break and release from the hollow rivet after the forming of the rivet tail to a predetermined but fully fastening flare so that said hollow rivet alone can hold objects together.

3. A rivet assembly comprising, a hollow rivet, a rivet head on one end of the hollow rivet, a shank slidably extended through the hollow rivet, a forming head on the shank at the unformed tail of the rivet, a grip portion formed integrally on the shank outside the rivet head whereby the shank can be gripped for axial pulling of the shank and said forming head against the tail of the hollow rivet for forming said tail, said grip portion being wider than the passage in the rivet.

4. The method of riveting which consists in providing a rivet having an aperture through from its head to its tail, slidably assembling a tension member through said rivet, said tension member having a fixed former head thereon for forming a head on the tail end of the rivet, forming an engagement head on the tension member outside of the head of the rivet, introducing the rivet and its tension member together through an opening in a structure with a portion of the rivet and tension member extending beyond both sides of the structure, applying an axial force to the engagement head of the tension member and also applying a reactionary axial force simultaneously and continuously to the head of the rivet until after a rivet head is completely formed at the tail end of the rivet and the rivet is secured to said structure.

5. The method of riveting which consists in providing a rivet having an aperture through from its head to its tail, slidably assembling a tension member through said rivet, said tension member having a fixed former head thereon for forming a head on the tail end of the rivet, forming an engagement head on the tension member outside of the head of the rivet, introducing the rivet and its tension member together through an opening in a structure, applying an axial force to the engagement head of the tension member and also applying a reactionary axial force to the head of the rivet simultaneously and continuously until after a rivet head is completely formed at the tail end and the rivet is secured in place in said structure, continuing said axial forces until the breaking of the tension member, and then releasing the entire broken tension member from the rivet.

CARL W. CHERRY.